United States Patent [19]
Cao et al.

[11] Patent Number: 5,801,549
[45] Date of Patent: Sep. 1, 1998

[54] SIMULTANEOUS TRANSMISSION BIDIRECTIONAL REPEATER AND INITIALIZATION MECHANISM

[75] Inventors: Tai Anh Cao; Tom Tein-Cheng Chiu, both of Austin, Tex.

[73] Assignee: International Business Machines Corporation, Armonk, N.Y.

[21] Appl. No.: 766,642

[22] Filed: Dec. 13, 1996

[51] Int. Cl.[6] ............................................. H03K 19/0185
[52] U.S. Cl. ........................................ 326/83; 326/86; 326/23
[58] Field of Search ............................... 326/23, 30, 34, 326/83, 86; 375/257; 327/52; 826/82

[56] References Cited

U.S. PATENT DOCUMENTS

| | | |
|---|---|---|
| 4,363,121 | 12/1982 | Schlyter . |
| 4,384,322 | 5/1983 | Bruce et al. . |
| 4,412,335 | 10/1983 | Froment et al. ........................ 375/3 |
| 4,491,700 | 1/1985 | Tahara et al. . |
| 4,698,800 | 10/1987 | Cavaliere et al. . |
| 5,202,593 | 4/1993 | Huang et al. . |
| 5,216,667 | 6/1993 | Chu et al. . |
| 5,253,249 | 10/1993 | Fitzgerald et al. . |
| 5,280,526 | 1/1994 | Laturell . |
| 5,323,384 | 6/1994 | Norwood et al. . |
| 5,341,398 | 8/1994 | DeRango et al. . |
| 5,353,353 | 10/1994 | Vijeh et al. . |
| 5,369,640 | 11/1994 | Watson et al. . |
| 5,384,767 | 1/1995 | Moorwood et al. . |
| 5,384,769 | 1/1995 | Oprescu et al. . |
| 5,386,416 | 1/1995 | Neth . |
| 5,386,470 | 1/1995 | Carter et al. . |
| 5,387,902 | 2/1995 | Lockyer et al. . |
| 5,400,360 | 3/1995 | Richards et al. . |
| 5,412,716 | 5/1995 | Blaha . |
| 5,414,312 | 5/1995 | Wong ........................................ 326/83 |
| 5,479,504 | 12/1995 | Nakano et al. . |
| 5,528,686 | 6/1996 | Cwynar et al. . |
| 5,530,401 | 6/1996 | Cao et al. . |
| 5,541,535 | 7/1996 | Cao et al. ................................... 326/83 |
| 5,541,990 | 7/1996 | Rahamim . |
| 5,604,450 | 2/1997 | Borka et al. ............................... 326/82 |
| 5,654,981 | 8/1997 | Mahant-Shetti et al. ................. 326/83 |

*Primary Examiner*—Edward P. Westin
*Assistant Examiner*—Don Le
*Attorney, Agent, or Firm*—Mark E. McBurney

[57] ABSTRACT

The present invention provides a driver/receiver pair connected as a repeater circuit which simultaneously transmits and receives information on multiple connected transmission lines. Transceiver circuits are provided which are mirror images of one another to perform the repeater function of the present invention. Each transceiver in the repeater circuit includes a non-inverting buffer stage which produces a signal swing less than the typical Vdd to ground which is typical for common CMOS inverters. The limited swing provides a variable reference input to a differential receiver element. This receiver looks at the incoming signal, and the signal being transmitted from the repeater to determine if the incoming signal is logical "1" or logical "0". This is done on each side of the repeater since the actual voltage level on the wire at the repeater terminal is a composite of the signal received by the repeater and the signal being transmitted by the repeater. By using the repeater, the data rate is doubled and the transmission distance is increased when compared to simplex unidirectional operation.

19 Claims, 9 Drawing Sheets

SIMULTANEOUS TRANSMISSION BIDIRECTIONAL REPEATER AND INITIALIZATION MECHANISM

BACKGROUND OF THE INVENTION

The present invention relates to a repeater circuit that connects multiple data transmission lines. The repeater circuit includes plural driver/receiver pairs ("transceivers") which allow simultaneous bidirectional communications. More specifically, a repeater system is provided with first and second driver/receiver circuits connected to allow concurrent bidirectional data communications between remote transmitters and receivers.

Transceivers which bidirectionally and simultaneously send information between different driver/receiver circuits along a transmission line are known in the art. However, these circuits are typically implemented using bipolar technology. Bipolar logic is also referred to as transistor-transistor logic. In bipolar logic, a digital signal technique is used wherein a positive voltage signal and ground is alternated between a negative voltage signal and ground. Thus, multiple voltage sources are required for this type of technology to be implemented.

Complementary method oxide semiconductor (CMOS) technology pairs transistors together which complement one another and use varying positive voltage swings to activate/deactivate the circuits causing a logical "1" and/or logical "0" to be communicated to one another. Due to the positive and negative voltage requirements of bipolar circuits, multiple separate voltage sources are needed to implement this technology.

U.S. Pat. No. 5,541,535 describes a CMOS simultaneous bidirectional driver/receiver that uses a non-inverting, but does not discuss using this type of circuit as a repeater. Further, this reference does not address the initialization problems solved by the present invention.

There is currently an enormous amount of interest in networking computers by connecting server computers to clients through the Internet, or other on-line services. This interest places great demands on the communications infrastructure, such as telephone lines, wireless transmission facilities, and the like. The bandwidth, or capacity, of these facilities is already being pushed to its limits. A great deal of the existing data transmission lines are made up of two conductors (twisted pair), which limits the information handling capacity of the line.

To increase the bandwidth, it is possible to replace the two wire transmission line with expanded conductor lines. However, this is an extremely expensive solution and one that would require a great deal of time to physically replace the existing wire. Another solution would be to convert the transmission lines to wireless communications. However, the conventional solutions all require a great deal of time and resources, and, necessitate the replace of the existing telecommunications infrastructure. Therefore, it can be seen that a need exists for system that can expand the bandwidth of existing transmission lines and allow more information to be transmitted than currently possible.

Further, there may be relatively long transmission lines contained within a single computer system. For example, a mainframe computer may include lines on the order of one meter between various components, such as system logic implemented in a multichip module and the main memory. It may also be desired to connect another device, such as expanded memory, a dumb terminal, or the like to the primary computer system. These types of interconnections may very well span a distance of many meters. For such relatively long transmission lines, the greater length causes a dramatic increase in parasitic resistance. This resistance, in turn, causes a significant voltage drop along the transmission line. Therefore, the voltage available to turn on a receiver by changing states, or switching, is decreased proportionally. Thus, it can be seen that a need exists for a system that would provide sufficient voltage at the receiver circuit for them to turn on and recognize the presented digital signal. One conventional solution is to merely increase the power supply voltage that is used to drive the digital signals, however, this increase in power creates more heat and causes a heat dissipation problem. Therefore, a need also exists for a system that transmits and receives digital signals over relatively long distances without causing a drop in the signal voltage, which will have a negative impact on performance.

Additionally, the clock frequency of data processing systems is rapidly increasing. While this increased frequency allows faster processing of information, the pulse width of the digital signals will decrease. This, in turn, causes the high frequency circuits to become more susceptible to noise, especially over longer transmission line lengths. Thus, it can be seen that a need exists for the repeater circuit of the present invention to provide high frequency digital signals over relatively long transmission lines with high noise immunity.

SUMMARY OF THE INVENTION

The present invention provides a driver/receiver pair connected as a repeater circuit which simultaneously transmits and receives information on multiple connected transmission lines.

Broadly, the present invention provides at least one repeater circuit that allows for longer communication distances across existing conductive media, having limited bandwidth. This repeater circuit is inserted in series with a single wire pair where one wire carries the signal and the other provides the ground reference. The number of repeater circuits to be used is dependent on the characteristics, such as the length of the transmission line and its quality. Transceiver circuits are provided which are mirror images of one another to perform the repeater function of the present invention.

Each transceiver in the repeater circuit includes a non-inverting buffer stage which produces a signal swing less than the typical Vdd to ground which is typical for common CMOS inverters. The limited swing provides a variable reference input to a differential receiver element. This receiver looks at the incoming signal, and the signal being transmitted from the repeater to determine if the incoming signal is logical "1" or logical "0". This is done on each side of the repeater since the actual voltage level on the wire at the repeater terminal is a composite of the signal received by the repeater and the signal being transmitted by the repeater.

The repeater circuit is a symmetrical series insertable bidirectional repeater element that can be used multiple times to lengthen the distance for wire communication wherein just two conductors are present. By using the repeater, the data rate is doubled and the transmission distance is increased by use of the present invention when compared to simplex unidirectional operation.

The present invention connects transceivers connected as a mirror images of one another. A first transceiver includes a driver which outputs data to a first transmission line and a differential receiver that inputs data from this first transmission line. A second transceiver has a driver to provide data to a second transmission line and a differential receiver that obtains data from the second transmission line. Additionally, the output of the first and second receivers is provided to the input of the second and first drivers, respectively. Each of the first and second transceivers includes a non-inverting buffer in the input path to the differential receivers. The non-inverting buffer allows a plurality of different voltages to be possible, along with their corresponding voltage swings. This allows the differential receiver to compare the input voltage received from the transmission line with the output voltage from its associated driver. Therefore, the receiver is capable of determining the voltage level (and the corresponding logic level) input from the transmission at the same time its associated driver is outputting a logic signal to another driver/receiver pair, via the transmission line.

The present invention uses a single voltage source in each of the interconnected transceivers to provide multiple positive voltages to the differential receivers, such that differences in voltage levels which correspond to different logical combinations of "1" and "0" can be determined by the receiver.

Further, the present invention includes a novel initialization mechanism which ensures that the inputs to each driver are known logical values. This allows the repeater to begin transmitting and receiving data when the system is powered on.

The present invention is a system that provides simultaneous, bidirectional transfer of signals between integrated circuit devices. The system of the present invention includes a first and second driver/receiver pair, each having a differential receiver therein. A voltage source with multiple non-negative voltage signals is also provided wherein the non-negative signals indicate the state of the logic signals which are concurrently input to the differential receiver from the transmission line and the driver.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
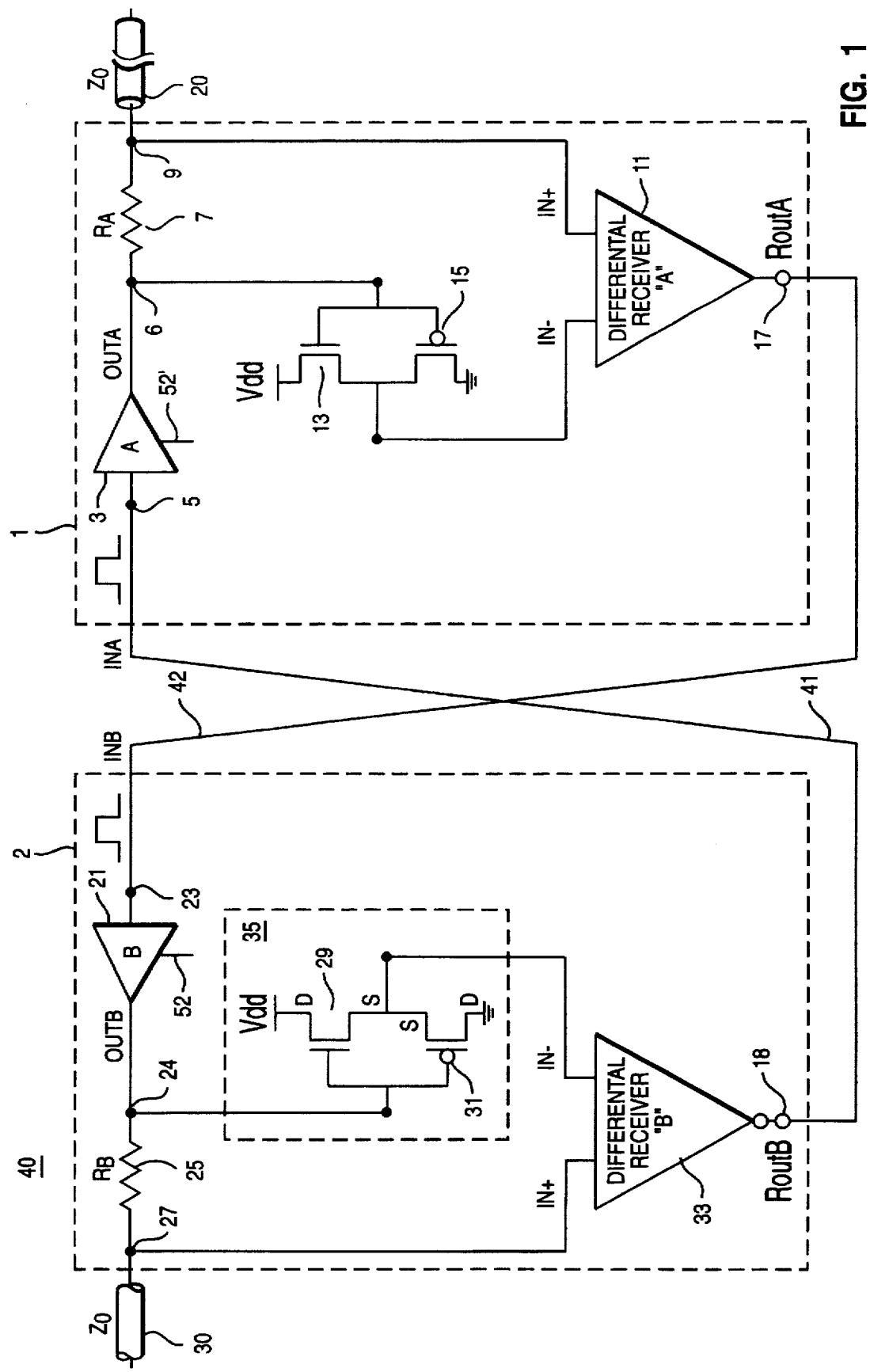
FIG. 1 is a schematic diagram of the present invention showing first and second driver/receiver pairs interconnected with one another and each connected to a transmission and each having a non-inverting buffer in the input path to the differential receiver for providing variable positive voltages in accordance with a preferred embodiment of the present invention.
Figure 3:
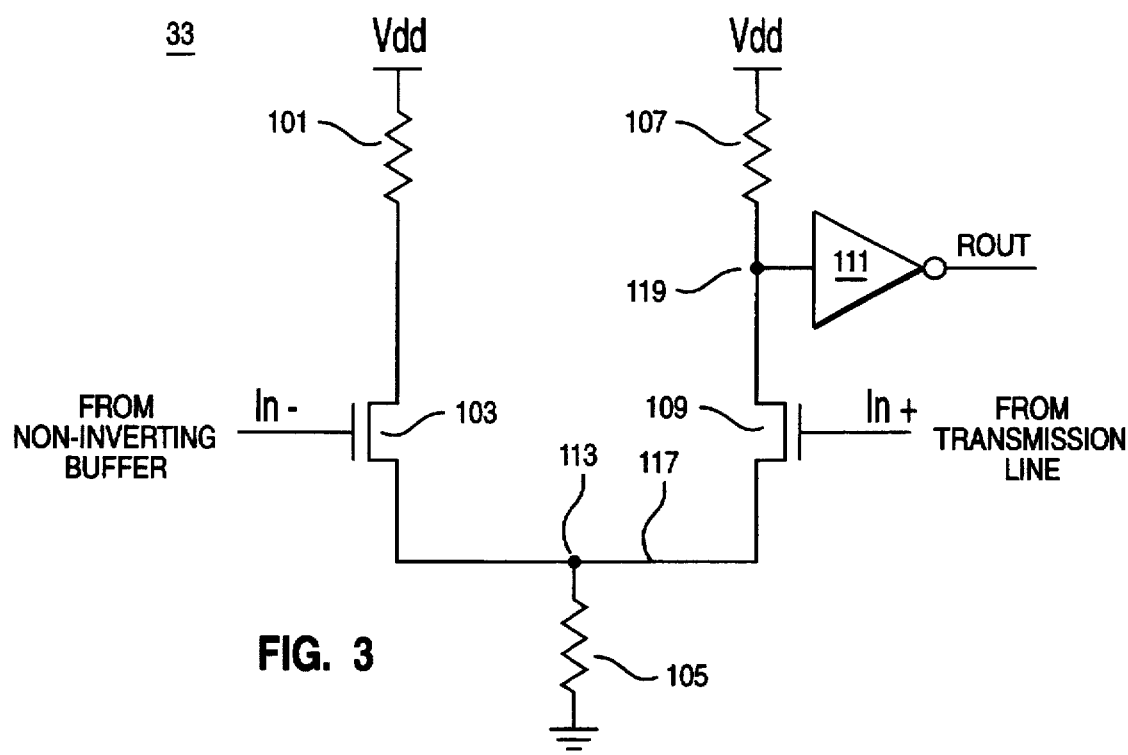
FIG. 3 is another circuit diagram of a differential receiver capable of being used in the system of the present invention.
Figure 4:
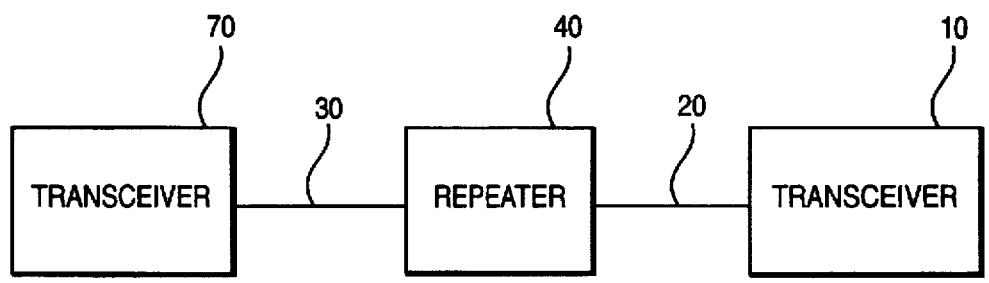
FIG. 4 is a high level block diagram showing how the repeater of the present invention is interconnected between various networked communication elements.

Referring to FIG. 1, a schematic diagram is shown of the repeater of the present invention having two driver/receiver pairs A and B (transceivers), generally referred to by reference numerals 1 and 2, respectively. The drivers 3 and 21 receive inputs INA and INB on nodes 5 and 23, respectively. Driver/receiver pair 1 includes a driver 3 which is any one of a typical driver circuit, as described in more detail with regard to FIG. 2. This driver is also capable of achieving a tri-state, or high impedance output state when operated in a unidirectional mode. The output of driver 3 enters a node 6 which is connected to a terminating resistor 7 (Ra). Node 6 is connected to transistors 13 and 15, which are connected as a non-inverting buffer. Transistor 13 is a "N" type device which is "turned on", i.e. it will present a low impedance between its source and drain, when a voltage potential is placed at its gate, with respect to ground. Transistor 15 is a "P" type device which is turned on when there is no voltage potential at its gate node, with respect to ground. In digital circuits the presence of a voltage is considered to be a logical "1" and the absence of a voltage is a logical "0". Thus, a "N" type device is turned on when a logical "1" is placed at its gate and turned off when a logical 0 is input. Conversely, a "P" type device is turned on when a logical "0" is placed at its gate and turned off when a logical "1" is input. The output of transistors 13 and 15 is then used as one input (IN−) to a differential receiver circuit 11 that outputs signal ROUTA. Receiver 11 is a typical differential receiver and is shown in greater detail in FIG. 3. Resistor 7 is also connected to node 9 which is used as the other input (IN+) to differential receiver 11. Additionally, node 9 is connected to a first transmission line 20 which interconnects driver/receiver 1 with a remote communications circuit, such as transceiver 10, shown in FIGS. 4 and 8. Transmission line 20 has a characteristic impedance Zo which is matched by the impedance of terminating resistor Ra 7 plus the impedance of driver 3 (Ra+Rda). The transmission line 20 will be matched by a terminating resistor Rb 225 at a remotely connected communications circuit, such as transceiver 10 of FIG. 8. Transceiver 10 includes a driver 221 and receiver 233, which transmit and receive logic signals between interconnected functional logic (not shown) and transmission line 20. Signal reflection will be minimized along transmission line 20 by matching the impedance of the driver 3, resistor 7 and the terminating resistor 225, driver 221 of transceiver 10, with the impedance of transmission line 20. Resistor 7 and the terminating resistor 225 of transceiver 10 will be of equal value in order for the impedance to match. Further, the sum of resistor Ra 7 and the impedance of driver 3 must be equal to the impedance of transmission line 20. Similarly, the sum of resistor Rb' 225 and the impedance of driver 221 must also be equal to the impedance of transmission line 20. It should be noted that multiple series connected repeaters 40 of the present invention, as shown in FIGS. 1 and 4, can be used to efficiently transmit information between communications circuits, such as transceivers 10 and 70. This data transmission is bidirectional, concurrent and implemented using a minimum of electrical conductors.

Transceiver 2 is identical to transceiver 1. A driver 21 is provided with input signal INB from line 42. The output of driver 21 is connected to a resistor 25 (Rb), via node 24, and a pair of transistors 29 and 31, connected as a non-inverting buffer. Transistor 29 is a "N" type and transistor 31 is a "P" type, the distinction being described above. The output of the transistor pair is provided as input (IN−) to a differential receiver circuit 33. Resistor 25 is connected to a node 27 which, in turn is connected to a second transmission line 30, and input to the differential receiver circuit 33 (IN+), which outputs a signal ROUTB on node 18.

The output RoutA on node 17 from receiver 11 is provided along line 42 as the input to driver 21 (INB) at node 23. Similarly, RoutB from receiver 33 on node 18 is supplied to driver 3 from line 41 and input at node 5 signal INA. It can be seen that transceivers 1 and 2 are connected as a mirror images of one another to form repeater circuit 40.

Reference numeral 35 relates to the non-inverting buffer circuit shown by transistors 29 and 31. It should be noted that the following description applies equally to the non-inverting buffer circuit formed by transistors 13 and 15, however, for the sake of simplicity, a single description is included herein. The non-inverting buffer includes "N" device 29 with its drain connected to Vdd, and "P" device 31 having its drain connected to ground. In a preferred embodiment the voltage of the input signal from node 24 will be in the range of 0 to 2.5 volts, where 0 is ground and 2.5v is Vdd. If the threshold voltage of transistors 29 and 31 is 0.7 volts, then the signal output to the differential receiver 33 (IN−) will have a voltage swing of from 0.7 to 1.8 volts. Due, to its non-inverting low voltage swing, the buffer 35 serves as a non-inverting, dynamically varying reference voltage that does not swing below ground potential. Thus, non-inverting buffer 35 provides the reference voltage for the differential receiver.

When the voltage level at node 24 is a logical "1", then transistor 29 is turned on and transistor 31 is turned off. In this case, since the threshold voltage of the transistor is 0.7 volts, a voltage drop of 0.7 volts is effectively placed across transistor 29. And, since 2.5−0.7=1.8, a voltage of 1.8v is input to the differential receiver 33 as IN−. However, if a logical "0" is present on node 24 and input to transistors 29 and 31, then "P" type transistor 31 is turned on and "IN" type transistors 29 is turned off. Therefore, the threshold voltage of 0.7 volts is placed across transistor 31. Since, transistor 31 is connected to ground, or 0 volts, the threshold voltage is added to the ground potential. In this case, 0+0.7=0.7, and a voltage of 0.7 volts is present at the input to differential circuit 33. As noted above, the previous description also applies to transistors 13 and 15, included in transceiver 1.

While the present invention is shown and described using CMOS technology, it should be noted that other implementations of the repeater circuit of FIG. 1 using other technologies such as bipolar, BiCMOS and the like are also contemplated by the present invention. For example, repeater 40 of FIG. 1 could be include a transceiver 1 implemented in CMOS and a transceiver 2 implemented in bipolar technology. Those skilled in the are will understand that CMOS technology uses all non-negative voltage levels to switch the devices, while bipolar technology uses a positive to negative voltage swing. Therefore, an interface between transceivers 1 and 2 will need to be provided to convert CMOS signals to bipolar and vice versa. This converter will be inserted between transceivers 1 and 2 of FIG. 1 along signal lines 41 and 42. These types of CMOS to bipolar and bipolar to CMOS converters are well known in the art and will not be described further herein.

Figure 2:
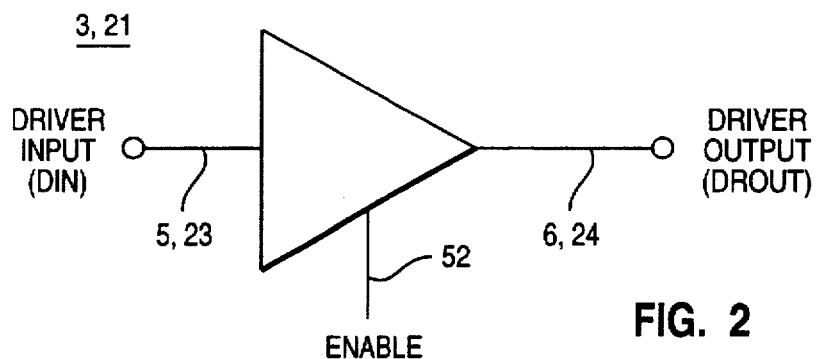
FIG. 2 is a circuit diagram showing a typical driver which can be used by the present invention.

Referring to FIG. 2, a typical driver capable of being used by the present invention is shown. Reference numerals 3 and 21 indicate that the driver shown in FIG. 2 is one that may be used by the present invention in the circuit of FIG. 1. Input nodes 5 and 23 correspond to the input of drivers 3, 21, respectively, as shown in FIG. 1. Node 5 is connected to line 41 from receiver 33, and node 23 is connected to line 42 from receiver 11. Similarly, output nodes 6, 24 correspond to the output of drivers 3 and 21 as shown in FIG. 1. Enable node 52 is connected to the driver circuit and controls its operation based on the input.

The operation of the driver circuit of FIG. 2 will now be described using driver 3 as an example. However, it should be noted that driver 21 will operate in precisely the same manner. If a logical one is applied to the input node 5, and the enable node 52 is active, then the output node 6 will be driven to a voltage level that is close to the Vdd voltage level. Thus, when a logical one is applied to the input 5, and node 52 is enabled, then a logical one will output at node 6. Conversely, if a logical zero is applied to the input node 5, with the enable node 52 activated the output node 6 will be driven to a voltage that is close to ground potential, or zero volts. In this manner, a logical zero input, with node 52 enabled, will cause a logical zero to be driven onto node 6. If the enable node is not activated, the output node 6 is placed in a high impedance state (tri-stated) and drivers 3, 21 (for example) will not respond to changes in the input voltage at nodes 5, 23. Those skilled in the art will understand that enable node 52 is controlled by a control unit, such as a microprocessor, embedded controller, I/O controller, memory controller, or the like. When the control unit (not shown) determines that a logical "1" or logical "0" should be output, an enable signal is presented to drivers 3, 21 at node 52. In this manner, the output of transceivers 1 and 2 at nodes 6 and 24, respectively, is controlled. FIG. 3 is a schematic diagram of a differential receiver circuit 33 used in a preferred embodiment of the present invention. The output of non-inverting buffer 35, described previously, is input to differential circuit 33 at transistor 103. Transmission line 20 is connected to receiver circuit 33 at transistor 109. Line 117 connects transistors 103 and 109. Circuit 33 also includes resistors 101 and 107, connected to Vdd, as well as resistor 105, which is connected to ground. As noted above, the output of non-inverting buffer 35 will either be 0.7 volts or 1.8 volts. These voltage inputs are supplied to the gate of transistor 103 (IN−). The voltage inputs to transistor 109 (IN+) will be either 2.5, 0, or 1.25 volts, depending on whether one or both of drivers 3 and 21 are outputting logical 1's and 0's to transmission line 20 (and what combination of 1's and 0's are being driven onto the line). The transistors 103 and 109 of receiver circuit 33 (and 11) have the same values, and based on the voltage input will cause either a logical 0 or a logical 1 to be output to inverter 111 and ultimately to another integrated circuit device that requiring the digital signal.

FIG. 4 shows a high level view of how the repeater of the present invention can be used. Transceivers 10 and 70, which may be the I/O portion of a multichip module, memory, or the like need to communication with one another. However, the only transmission path between these transceivers is a single pair. The repeaters of the present invention can be inserted at predetermined points, intermediate to the transceivers. In this manner, bidirectional, simultaneous communications can be implemented between elements 10 and 70, via transmission lines 20 and 30, which effectively become a single transmission line.

| Receiver 233 | | | | | |
|---|---|---|---|---|---|
| TR. LINE 20 | NODE 227 | NODE 223 | IN+ | IN– | ROUTA' |
| 2.5 v | 2.5 v | 2.5 v | 2.5 v | 1.8 v | 2.5 v |
| 0.0 v | 0.0 v | 0.0 v | 0.0 v | 0.7 v | 0.0 v |
| 1.25 v | 1.25 v | 0.0 v | 1.25 v | 0.7 v | 2.5 v |
| 1.25 v | 1.25 v | 2.5 v | 1.25 v | 1.8 v | 0.0 v |

| Receiver 211 | | | | | |
|---|---|---|---|---|---|
| TR. LINE 30 | NODE 29 | NODE 25 | IN+ | IN– | ROUTB' |
| 2.5 v | 2.5 v | 2.5 v | 2.5 v | 1.8 v | 2.5 v |
| 0.0 v | 0.0 v | 0.0 v | 0.0 v | 0.7 v | 0.0 v |
| 1.25 v | 1.25 v | 0.0 v | 1.25 v | 0.7 v | 2.5 v |
| 1.25 v | 1.25 v | 2.5 v | 1.25 v | 1.8 v | 0.0 v |

Figure 8:
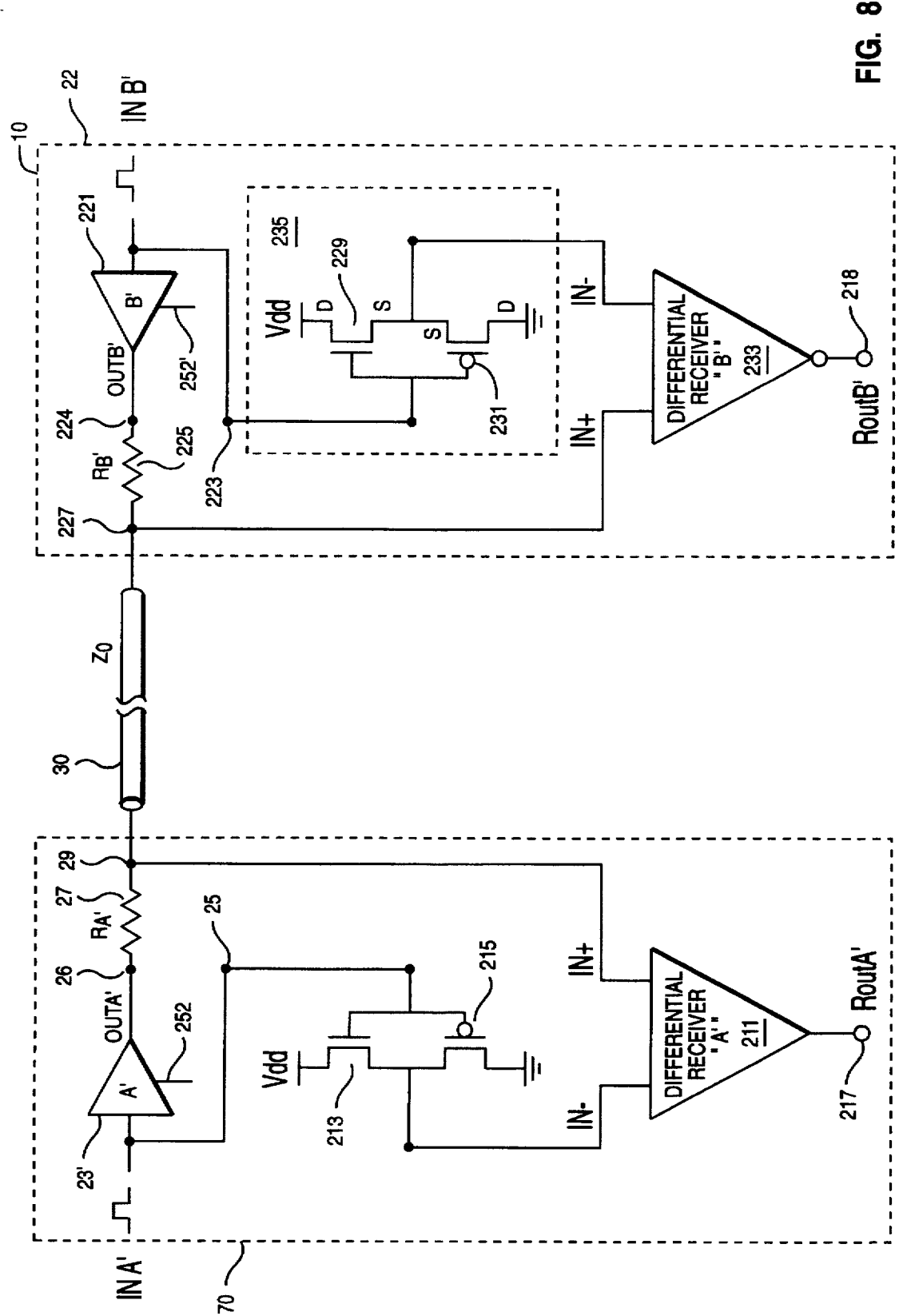
FIG. 8 is a schematic diagram of the components in each of the transceiver circuits connected by the repeater circuit of the present invention.

The previous table represents the various inputs, and corresponding outputs, of differential receiver circuits 211, of transceiver 70 and 233 of transceiver 10, as shown in FIG. 8. In a preferred embodiment, a logical "1" is represented by 2.5 volts (Vdd) and a logical "0" is indicated when 0.0 volts (ground) is transmitted. Those skilled in the art will understand that 2.5 volts is an example and the present invention is fully capable of operating with lower voltages utilized by current technologies, such as where Vdd is equal to 1.8 volts. As noted previously, only differential receiver 233 will be described, however, it should be understood that the description will apply equally as well to receiver 211.

The first case (mode 1) will now be described where both drivers 23 and 221 are outputting 2.5 volts, there will be 2.5 volts on transmission line 20, due to the fact that there will be no DC current will flow in steady state conditions. Since no current is flowing through terminating resistances 225 and 27, there will be no voltage drop across these resistors. This 2.5 volts at node 227 is then input to receiver circuit 233 at transistor 109 of FIG. 3 (IN+). The 2.5 volts which is input to driver 221 is provided to non-inverting buffer 235 from node 223. The non-inverting buffer 235 then outputs 1.8 volts (2.5 volts–0.7 volt threshold of transistor 229) which is input to transistor 103 (FIG. 3) of receiver circuit 33 (IN–). The 2.5 volts at transistor 109 and 1.8 volts at transistor 103 cause them to turn on, thereby creating a path through node 113 to resistor 105. Those skilled in the art will understand that an "N" channel field effect transistor (FET) can be substituted for device 105. The data of the N channel transistor can then be used to disable the receiver when it is not being used and therefore eliminate the DC current flow through the differential amplifier. The characteristics of transistors 103 and 109 are identical, however, the impedance of these devices will vary based upon the input voltage. Thus, in mode 1, the impedance across transistor 109 will be less than the impedance presented by transistor 103. Since the values of resistors 101 and 107 are identical, the current path from Vdd to ground will be through resistor 105, transistor 109, and resistor 107. This lower impedance path causes a higher current flow through node 119, causing a lower voltage to be present. This low voltage (substantially ground) effectively causes node 119 to be at a logical "0". Inverter 111 then supplies 2.5 volts, or a logical "1" as the output of receiver circuit 233 (ROUT).

In the second case (mode 2) both drivers 23 and 221 are sending a logical "0". In this case there will be 0.0 volts input to transistor 109 from transmission line 20, via node 27 (IN+). Additionally, the input at node 223 is 0.0 volts which causes transistor 31 to turn on and provide a 0.7 volt input to transistor 103 of receiver circuit 233. The 0.0 volt input to transistor 109 will not turn it on, thereby effectively creating an open circuit. However, the 0.7 volts input to transistor 103 will turn it on allowing current to flow through resistor 101, transistor 103 and resistor 105. Node 119 is connected to Vdd (2.5 volts) through resistor 107 and there is no current flowing through resistor 107 and transistor 109. Therefore, the voltage at node 119 is allowed to reach Vdd. This voltage causes a logical "1" to be input to inverter 111 and a logical "0" to be output therefrom.

In mode 3, it is assumed that driver 23 is outputting a logical "1" signal of 2.5 volts and driver 221 is outputting a logical "0" of 0.0 volts. In this case, the 2.5 volt signal from driver 23 is divided across resistor 27 (which is a terminating resistance and will halve the voltage) causing 1.25 volts to present on transmission line 20. This 1.25 volts is also present at node 227 and is input to transistor 109 of receiver 233 as IN+. At the same time, 0.0 volts is input to non-inverting buffer 235 via node 223, causing 0.7 volts to be output to the gate of transistor 103. Thus, both transistors 103 and 109 will be turned on, however, transistor 109 will have a lower impedance, due to the higher input voltage. Therefore, the current will flow through resistor 107, transistor 109 and resistor 105, such that a logical "0" will be present at node 119. Inverter 111 will then provide a logical "1" signal of 2.5 volts out as ROUT.

In mode 4 driver 23 is outputting a logical "0" of 0.0 volts and driver 221 is outputting a logical "1" of 2.5 volts. In this instance, the 2.5 volt output of driver 221 is divided across resistor 225 such that a voltage of 1.25v is placed on transmission line 20 and input to receiver circuit 233 at transistor 109. The 2.5 volts input to driver 221 is also provided to non-inverting buffer 235 via node 223. The 2.5 volt input will generate a 1.8 volt output from circuit 235, which is input to transistor 103 of receiver circuit 233. The 1.8 volts input to transistor 103 will turn it on and present less impedance than transistor 109, due to the smaller 1.25 voltage input to transistor 109. Therefore, in this case, the current path will be through resistor 101, transistor 103 and resistor 105. This causes a voltage close to Vdd to be present at node 119 and inverter 111 will output a logical "0" as ROUT.

The previous example has been shown with reference to receiver circuit 233, however receiver circuit 211, in conjunction with the non-inverting buffer formed by transistors 213 and 215 will operate in exactly the same manner. Therefore, it can be understood from the previous example how driver/receiver circuits 23 and 211, and driver/receiver pair 221 and 233 can operate independently and in parallel to simultaneously and bidirectionally transmit digital signals along transmission lines 20 and 30.

Further, in mode 1, since both drivers have output voltages of 2.5 volts, a steady state condition occurs where no current flows in transmission lines 20 and 30, and the voltage at nodes 29 and 227 will be 2.5 volts. In this case a voltage of 2.5 volts will be input as IN+ to both receiver circuits 211 and 233. At the same time, the non-inverting buffers supply 1.8 volts to both receivers as IN–. Since the voltage at IN+ is greater than the voltage at IN– (for both receivers), a logical "1" is output and effectively transmitted from one driver/receiver pair to the other.

In mode 2, when both drivers output voltages of 0.0 volts, no steady state current flows in transmission lines 20 and 30, and the voltage at nodes 29 and 227 will be 0.0 volts and input to receivers 211 and 233 as IN+. Concurrently, the non-inverting buffers provide 0.7 volts to the differential receiver circuits 211 and 233 as IN−. Since IN− is greater than IN+, the differential receivers 211 and 233 will output a 0.0 volts demonstrating how a logic "0" can be simultaneously, bidirectionally transmitted between transceivers 10 and 70.

During mode 3, driver 23 is outputting a logical "1" and driver 221 is outputting a logical "0". In this case, the voltage at nodes 29 and 227 will be 1.25 volts and input to receivers 211 and 233, respectively, as IN+. In the case of receiver 211, 2.5 volts is input to the non-inverting buffer circuit including transistors 213 and 215, such that a voltage of 1.8 is output to receiver 211 as IN−. With regard to receiver 211, since IN− is greater than IN+, a logical "0" is output from receiver 211. However, due to the 0.0 volts input to non-inverting circuit 235, via node 223, 0.7 volts is input to receiver 233 as IN−. Thus, since IN− is less than the 1.25 volts input to receiver 233 as IN+, a logical "1" is output. This description illustrates how transceiver 10 simultaneously transmits a logical "0" and receives a logical "1" from transceiver 70. Similarly, transceiver 70 simultaneously transmits a logical "1" and receives a logical "0" from transceiver 10.

Mode 4 is similar to mode 3 except that driver 23 is outputting a logical "0" and driver 221 is outputting a logical "1". In mode 4, the voltage at nodes 29 and 227 will again be 1.25 volts and input to receiver 211 and 233, respectively, as IN+. Zero volts is input to the non-inverting buffer including transistors 213 and 215, and a voltage of 0.7 volts is output to receiver 211 as IN−. Since, the 0.7 volts of IN− is less than the 1.25 volts of IN+, a logical "1" will be output by receiver 211. With regard to receiver 233, 2.5 volts is input to non-inverting buffer 235, causing 1.8 volts to be supplied to receiver 233 as IN−. Receiver 233 then outputs a logical "0" since IN− is greater than the 1.25 volts inputs as IN+. Thus, transceiver 70 is able to transmit a logical "0" to transceiver 10, while concurrently receiving a logical "1" therefrom. Additionally, transceiver 10 sends a logical "1" to transceiver 70 and simultaneously receives a logical "0" from it.

In some cases, the transceiver circuits 10 and 70 can be used individually in conjunction with another driver or receiver which is physically located on a separate IC chip. Thus, a chip designer/manufacturer may use, for example, the driver/receiver circuit 10 of FIG. 8 as the I/O interface to circuitry on a different chip, potentially fabricated by a different manufacturer. Additionally, transceivers 10 and 70, as well as the driver/receiver circuits can be of mixed technologies, such as bipolar and CMOS. That is, transceiver 10 could be bipolar and transceiver 70 could be CMOS, with each having a converter to interface with the other. Further, a driver circuit within a transceiver could be of a different technology than a receiver within the same transceiver. This transceiver with then include a converter to interface the driver and receiver circuits.

The case of unidirectional operation (digital signals will be output and received by the circuit, just not simultaneously) by transceiver 70 will now be described, referring again to FIG. 8. For the purposes of this discussion, it will be assumed that transmission line 30 connects transceiver 70 on a first chip with a driver and/or receiver on another chip.

In one mode, transceiver 70 will output a digital signal onto transmission line 30. In this case either a logical "1" or logical "0" is input to driver 23 (INA'). As noted above in conjunction with the description to FIG. 2, enable node 552 will be active when the circuit is operating as a driver. Thus, a digital signal, directly corresponding to the digital signal input, will be output on node 26. The signal is then transmitted along transmission line 30 to the off-chip receiver circuit.

In a second mode, transceiver circuit 70 will receive a digital signal from an off-chip driver, via transmission line 30. In this case, the enable signal 252 is not activated, causing the driver 23 to tri-state (present a very high impedance). The signal received by transceiver 70 is then immediately input from transmission line 30 to differential receiver 211.

More particularly, in FIG. 8, the input to transistors 229 and 231 (node 223 is shown as being connected to the input to driver 221 (INB'). Also, the input to transistors 213 and 215 (node 25) is shown connected to the input to driver 23 (INA'). This type of connection does not allow unidirectional operation. In order for unidirectional operation to be enabled, the inputs to these transistor pairs (i.e. transistors 229, 231 and transistors 213, 215) have to be connected to the output of drivers 221 and 23. More particularly, the output of driver 221, which is node 224 (OUTB') will be connected to node 223 and node 26 (OUTA'), which is the output of driver 23, will be connected to node 25. Further, for the purposes of this discussion, the connection between the driver inputs INA' and INB' and nodes 25 and 223, respectively are deleted.

With the modifications to the circuit of FIG. 8 as described above and with the driver 23 tristated, there is no current flow through resistor RA'. Therefore, the logic signal output by driver 221, either a logical 0 or a logical 1, will be present at node 29 and node 26 at the same time. If a logical 0 is received from driver 221, via transmission lines 20, 30 and the repeater circuit of FIG. 1, this logical 0 (0 volts) is provided to the IN+ input of differential receiver 211 from node 29. Also, this logical 0 (0 volts) is also input to transistors 213 and 215 via node 26 (now connected to node 25, as discussed above). The zero volts will turn on transistor 215, which pulls the reference potential up by its threshold voltage of (in this case) 0.7 volts. This 0.7 volts, which has been converted by transistors 213, 215 is input to IN− of receiver 211. Since the voltage at IN− (0.7 volts) is greater than the voltage at IN+ (0 volts), a logical 0 (0 volts) is output by receiver 211 to node 217.

Similarly, if a logical 1 is received, from driver 221, this logical 1 (2.5 volts in this example) is provided to the IN+ node of receiver 211 from node 29. Also, this logical 1 (2.5 volts) is input to transistors 213 and 215, via node 26. The 2.5 volts turns on transistor 213 and causes a voltage of 1.8 volts (Vdd— threshold voltage of transistor 213; 2.5−0.7= 1.8) to be input to IN− of receiver 211. Since voltage at IN− (1.8 volts) is smaller than IN+ (2.5 volts), a logical 1 (2.5 volts) is output by receiver 211 to output node 217.

Transceivers 10 and 70, as shown in FIG. 8, can be used for bi-directional, simultaneous digital signal transmission when the circuits are on the same chip (and thus known to the designer). Further, if it is known that another chip uses this particular transceiver (e.g. when the chips are designed and/or fabricated by the same entity) bi-directional, simultaneous digital signal transmission is possible. Even, in the case where transmission line 30 is connected to a chip having unknown circuitry thereon, the transceiver circuits 10 and 70 can still be used, albeit as a uni-directional driver/receiver, where digital signals are sent and received one at a time (as discussed immediately above).

Those skilled in the art will understand that when the transceivers 10 and 70 are utilized for chip to chip communications, the resistors 27 and 225 must be set to equal values. Further, the impedance of each of the drivers 23 and 221 must also be equal. And, the sum of the driver impedance and the resistor values for each transceiver circuit (i.e. Ra+ impedance of driver 23; Rb+ impedance of driver 221) must be equal to the impedance of an interconnecting transmission line. This allows the driver/receiver circuits to match the impedance of the transmission line to avoid reflection of the signal. In the circuits of FIG. 8, the resistances 27 and 225 can be varied by means known in the art, such as using a transistor, connecting an additional external resistor, or the like.

As shown in FIG. 1, internal line 42 provides the output of receiver 11 to the input of driver 21, as node 23, e.g. RoutA and INB are the same signal. Similarly, line 41 supplies the output of receiver 33 (RoutB) to the input (INA) of driver 3, on node 5.

In order for the repeater circuit of FIG. 1 to commence simultaneous bidirectional operation, it must be initialized. More particularly, lines 41 and 42 must have a known state, i.e. logical "1" or logical "0". In order for circuit 40 to operate as a repeater the voltage at the driver input must have a known state, or the driver must be tristated to first initialization unidirectional operation. Having a known state on lines 42 and 41 allows for the repeater circuit to operate properly and simultaneously transmit data bidirectionally. An undetermined state will not allow the simultaneous bidirectional mechanism to work correctly.

Those skilled in the art will understand that many methods exist which can be utilized to solve the problem of having an undetermined state at the interface between the output of a receiver and the input to a driver at the time when a computer system is powered on.

The present invention describes the following techniques for initializing the repeater circuit of FIG. 1, however, other techniques are contemplated by the scope of the present invention.

There are two different modes in which the initialization can occur. These modes are a unidirectional mode wherein signal transmission initially occurs in only one direction, and bidirectional mode where the repeater circuit is capable of initially transmitting signals in two directions.

Also, there are three different techniques which can accomplish this initialization. These techniques are: (1) connecting a "weak" (high impedance) N type transistor to the input lines to the drivers of the repeater circuit; (2) using a latch to maintain a known value at the input to the drivers; and (3) using an enable signal to tristate the driver at appropriate time during initialization.

Figure 10:
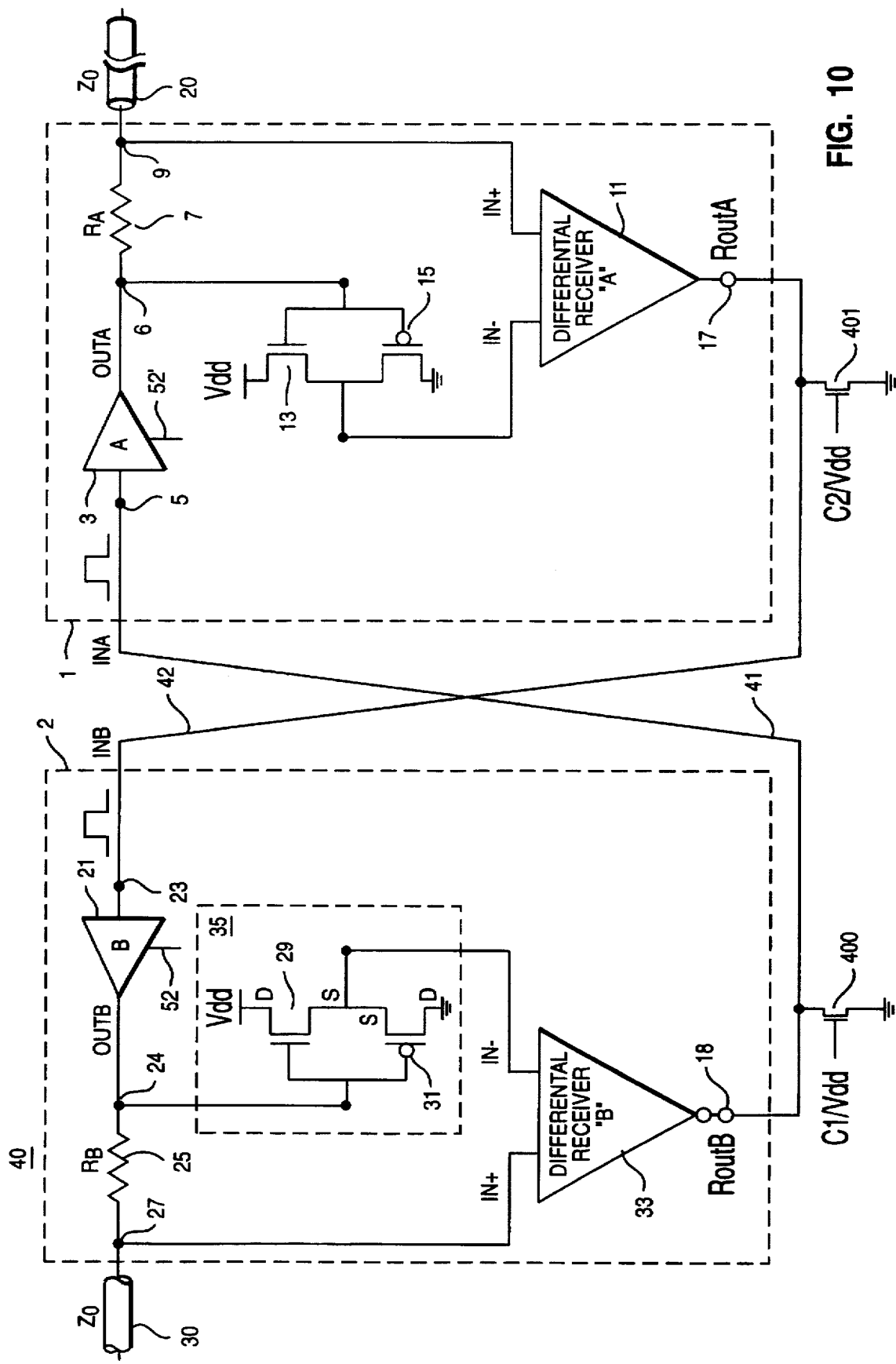
FIG. 10 is a schematic diagram of the repeater circuit of FIG. 1 showing a first embodiment of an initialization technique.

The previously mentioned techniques will now be described in more detail. For the purposes of this discussion FIGS. 8 and 10 are considered together, wherein the repeater of FIG. 10 is connected to transmission lines 20, 30 of the circuit of FIG. 8. FIG. 10 shows the repeater circuit of the present invention substantially as shown in FIG. 1. Where reference numerals are used in FIG. 10 which have previously been used in FIG. 1, the same items are represented. However, FIG. 10 does illustrate one initialization mechanism of the present invention including the addition of "weak" N-FET devices 400 and 401. It can be seen that transistor 400 is connected between input line 41 and ground with either a control signal C1 or Vdd being input to its gate. Transistor 401 is connected between line 42 and ground and has a control signal C2 or Vdd input to its gate.

For initialization in unidirectional mode using "weak" N-FETs, only one of the transistors 400, 401 are needed. As shown in FIG. 10, there are two input lines 41 and 42, to drivers 3 and 21, respectively. However, for unidirectional initialization only one of these input lines needs to be connected to a "weak" N-FET device, such as 401. For the purposes of this description, it will be assumed that only N-FET 401 (connected to line 42) of FIG. 10 is provided. A first embodiment of the present invention will be described wherein the gate of transistor 401 is connected to Vdd (2.5 volts).

Transistor 401 will always be turned on when its gate is connected to Vdd. Because N-FET 401 is "weak" it will have a high impedance relative to the signals on the input line 42. In this example, driver 23' of FIG. 8 will send an initialization signal (non-negative voltage) on transmission line 30, which is received at node 27 of the repeater circuit of FIG. 10. Driver 21 of FIG. 10 outputs a zero, such that there is a voltage close to ground at node 24. Thus, receiver 33 of FIG. 10 is able to receive and decode the signal from driver 23. The initialization signal is then sent to driver 3 (FIG. 10) along line 41. With driver 221 in a known state (i.e. the input to driver 221 has to be a logic "1" or a logic "0" during initialization period), receiver 233 is able to decode the signal received from driver 3, via transmission line 20. This results in the input line 41 to driver 3, which is fed by the output of receiver 33, being in a known state, even though it does not have a pull down N-FET device (in this example).

Subsequent to this initialization, drivers 221 and 23' of FIG. 8 can begin their simultaneous bidirectional data transmission. It should be noted that when the receiver 211 in FIG. 8 receives a logic "1", sent by driver 221, there will be a small noise margin loss in line 42. This is due to the fact that transistor 401 is always on. Even though it is "weak" and presents a high impedance, there will be some conductance that may induce a small amount of noise to be present.

Another aspect of this embodiment is the use of a control signal, e.g. C2 connected to the gate of transistor 401. The initialization operation will be substantially the same as described above. However, the noise margin loss can be virtually eliminated since the N-FET device 401 can be turned off after the repeater circuit is initialized. Of course, using a control signal does add a degree of complexity, since control circuitry must be added to output the control signal C2.

By using a single transistor 401 connected to only one of the driver input lines, e.g. 41, 42 a single transmission line with many connected repeater circuits 40 can be used as unidirectional line or simultaneous bidirectional line. If it is known that only unidirectional data transmission from, for example, driver 23' to driver 221 (FIG. 8), only line 42 needs to be in a known state. Conversely, if the unidirectional transmission is from driver 221 to driver 23', then only line 41 will need to be in a known state. This embodiment is useful when different types, or models of drivers are connected by the same transmission line.

In another preferred embodiment, it is possible to initialize the repeater circuit 40 in a simultaneous, bidirectional state. In this case, both N-FET transistors 400 and 401 of FIG. 10 will be utilized. Again, these transistors are "weak" and present a high impedance to the driver input lines 41 and 42. In a first case, the gates of both transistors 400 and 401 are connected to Vdd and will be in a turned on state.

The presence of transistors 400 and 401 of FIG. 10, connected between lines 41 and 42, respectively, will cause lines 42 and 41 in FIG. 1 to be in a known state. This is due to the fact that transistors 400 and 401 are always turned on and provide a known value (i.e. ground potential). In this case, drivers 23' and 221 of FIG. 8 can initially send the data in simultaneous bidirectional mode immediately with no initialization period required. Again, there will be some amount of noise margin that is lost in driver input lines 41 and 42, because of the always turned on N-FET devices 400 and 401. This is particularly true when a logical "1" is present on input lines 41 and 42.

A second aspect of this preferred embodiment is where the gate of transistors 400 and 401 are each connected to a control signal, such as signals C1 and C2. When the gates of N-FETs 400 and 401 are tied to control signals C1 and C2, the simultaneous, bidirectional initialization operation is similar to that described above when the gates are connected to Vdd. However, to prevent loss of noise margin, the N-FET devices 400 and 401 can be turned off once the repeater circuit is initialized. Again, complexity is added due to the need for control circuitry that will issue the control signals C1 and C2. This embodiment of the present invention is useful when many repeater circuits, such as circuit 40 are connected using the same transmission line. That is, when many repeaters are inserted along between transceivers 10 and 70 of FIG. 4. Using this technique the transmission line can be used as a unidirectional line or a simultaneous bidirectional line. When simultaneous bidirectional data transmission can occur between transceivers 70 and 10 (FIG. 8), then lines 41 and 42 (input to drivers 3 and 21) need to be in a known state, which is accomplished by using some combination of transistors 400 and 401, as discussed above.

Figure 11:
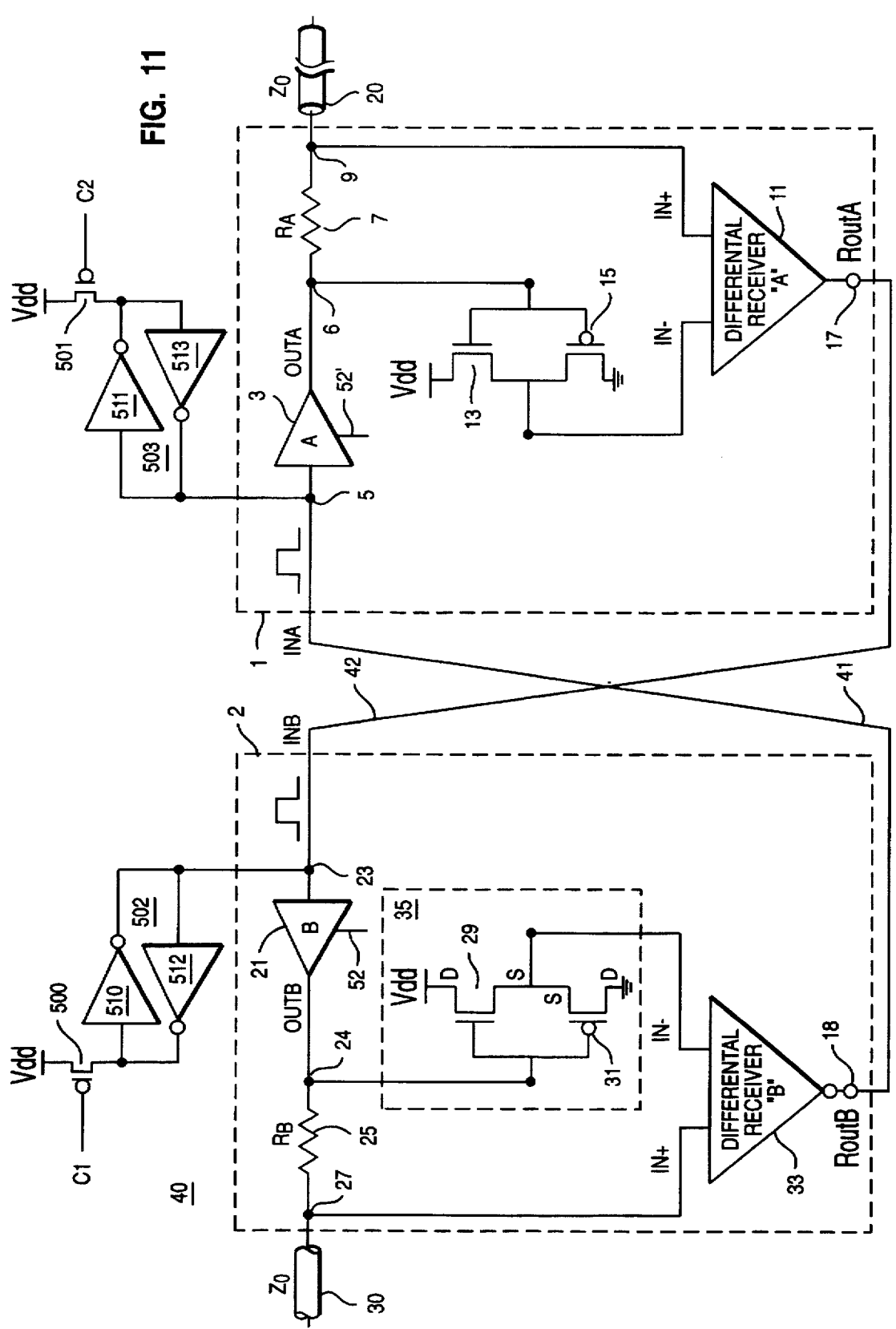
FIG. 11 is another schematic diagram of a preferred embodiment of the initialization technique of the present invention.

Referring now to FIG. 11, which will also be considered in conjunction with FIG. 8, another preferred embodiment of the present invention is shown and will now be described. In FIG. 11, reference numerals represent the same elements as previously discussed with regard to FIGS. 1 and 10. Once again, the goal of initialization is to ensure that the input to drivers 3 and 21 of repeater circuit 40 are in a known state at commencement of data transmission. In this embodiment, latches 502 and 503 are provided and connected to driver input lines 42 and 41, respectively. Latch 502 includes inverters 510 and 512, and latch 503 includes inverters 511 and 513. P-FET devices 500 and 501 are used to connect latches 502 and 503 to Vdd, respectively. Transistors 500 and 501 are turned on by control signals C1 and C2, respectively. These control signals are issued by control circuitry, not shown, which determines when a logical "0" should be provided to nodes 3 and 23. Those skilled in the art will understand that when transistor 500 is turned on and conducts electricity, a logical "1" (Vdd) will be input to inverter 510 of latch 502 and a logical "0" will then be output to node 23 and also be input to inverter 512. A logical "1" is then output by inverter 512 and stored in latch 502. Node 23 is electrically the same point as input line 42. Similarly, transistor 501 will be turned on by control signal C2 and a logical "1" is provided to inverter 513, which then outputs a logical "0" to node 3. Input line 41 is electrically identical to node 3. Inverter 513 then outputs a logical "0" to inverter 511, which outputs a logical "1" so that Vdd is stored in latch 503.

In the preferred embodiment of FIG. 11, initialization can occur in both a unidirectional and simultaneous bidirectional modes. For the case of unidirectional initialization only one of driver input lines 41 and 42 of FIG. 11 needs a latch. For the purposes of this discussion, it will be assumed that only input line 42 of FIG. 11 has a latch connected thereto (i.e.

latch 502). A control line C1 is present that is connected to control circuitry at the system level.

The initialization operation using latch 502 is similar to the initialization described above using only transistor 401. That is, latch 502 will ensure that line 42 (FIG. 11) is always at a known state (logical "0") in the same manner that transistor 401 kept line 42 (FIG. 10) at a known state of logical "0" during the initialization period.

Latch 502 is connected to Vdd with PFET device 500. This causes a logical "1" to be provided to node 23 when signal C1 is a activated. That is, a logical "0" input as C1 to transistor 500 will turn it on and cause a logical "1" to be input to inverter 510. This will cause a logical "0" to be placed on driver input line 42, via node 23. At initialization driver 23' of FIG. 8 will send an initialization signal (nonnegative voltage) on transmission line 30, which is received at node 27 of the repeater circuit of FIG. 11. Driver 21 of FIG. 11 outputs a zero, such that there is a voltage close to ground at node 24. Thus, receiver 33 of FIG. 11 is able to receive and decode the signal from driver 23'. The initialization signal is then sent to driver 3 (FIG. 11) along line 41. With driver 221 in a known state (i.e. the input to driver 221 has to be a logic "1" or a logic "0" during initialization period), receiver 233 is able to decode the signal received from driver 3, via transmission line 20. This results in the input line 41 to driver 3, which is fed by the output of receiver 33, being in a known state, even though it is not connected to a latch (in this example).

Subsequent to this initialization, PFET 500 will be turned off (by inputting a logical "1" to its gate) and drivers 221 and 23' of FIG. 8 can begin their simultaneous bidirectional data transmission. It should be noted that in this preferred embodiment, the presence of a latch connected to input line 42 will not cause a reduction in noise margin (as in the case of a transistor connected to line 42 with its gate tied to Vdd). Another advantage of this preferred embodiment is that the latch retains its data even if the transmission line is broken. In this embodiment the same transmission line can be used with many repeaters connected on it and it can be used as a unidirectional line or simultaneous bidirectional line. If it is known that there will only be unidirectional data transmission from driver 23' to driver 221, then only line 42 needs to be in a known state and only latch 502 is required. If unidirectional data transmission is to occur from driver 221 to driver 23", then only latch 503 will be needed to ensure that input line 41 is in a known state. This unidirectional mode could be used when different types of drivers (e.g. those that only work unidirectionally) are connected by the same transmission line. That is, when driver 23' only works in a unidirectional mode.

In another aspect of this embodiment, the repeater circuit of FIG. 11, can be initialized in simultaneous, bidirectional mode. In this case both input lines 41 and 42 need to be connected to a latch. FIG. 11 shows latch 502 connected to driver input line 42 and latch 503 connected to input line 41. The control signals C1 and C2 can be tied together or controlled separately for each one of the repeater circuits 40. It should be emphasized that the scope of the present invention contemplates plural repeater circuits 40 connected between driver/receiver pairs, such transceivers 10 and 70. Additional flexibility in controlling the direction of data flow can be realized by controlling the latches locally, i.e. keeping the controls separate.

It can be seen from FIG. 11 that both lines 41 and 42 are connected to a latch. The latches 502 and 503 provide that input lines 41 and 42 will always have a known state so that simultaneous, bidirectional transmission can occur when either driver 23' or 221 of FIG. 8 begins transmitting data. As noted above, by using latches, there will be no loss of noise margin in input lines 41 and 42. And, if the transmission line is broken, the data will remain stored in the latch.

This embodiment is useful when the same transmission line includes many repeaters. It allows the transmission line to be used as a unidirectional line or as a simultaneous bidirectional line. For simultaneous bidirectional data transmission to occur between transceivers 70 and 10 (FIG. 8), input lines 41 and 42 need to be in a known state.

FIGS. 1, 10 and 11 each show enable lines 52, 52' and FIG. 8 includes enable lines 252 and 252'. In the previously discussed preferred techniques for initializing the repeater circuit of the present invention, there is no need to bring out these enable lines to a pin, since the drivers 21 and 3 in the repeater circuit 40 are always in an active state. However, in another preferred embodiment, it is necessary for the enable lines 252 and 252' to be connected to an external pin on the integrated circuit.

In this embodiment initialization occurs only in unidirectional mode and the enable lines are brought out and used as control lines. It should be noted that enable lines 52, 52', 252, 252' are used to tristate the drivers, i.e. place the drivers in a high impedance condition.

The enable signal is independent of the input signal. When the enable signal on, for example line 52 of driver 21 (FIG. 1) is equal to a logical "1", the driver is activated and ready to receive the binary values of "0" and "1". But, when the enable signal input to a driver such as driver 21 is a logical "0", the driver is tristated and does not allow any signal propagation from input to output (node 23 to node 24). That is, when tristated a driver such as 21 will not allow a signal to be provided from INB to OUTB.

Therefore, whenever the driver is tristated it must be controlled externally to the repeater 40 (from the outside). Thus, the enable line 52 on the left of repeater circuit (to driver 21) should be brought out to an external pin. When plural repeaters 40 are present all of the enable pins 52 from each circuit should be interconnected and brought out to an external pin. Similarly the enable line 52' on the right of repeater circuit 40 of FIG. 1 should be brought out to a pin and when multiple repeaters are used all of the lines 52" should be tied together and brought to the outside.

The initialization process for the repeater circuit of the present invention will now be described for the embodiment where the enable lines are pinned out, as just described.

Two unidirectional transmissions are used to complete the initialization for this embodiment. First, transceiver 70 will propagate data in unidirectional mode to transceiver 10. This will cause driver input line 41 to have a known state. Secondly, data is propagated in unidirectional mode from transceiver 10 to transceiver 70 to cause line 42 to have a known state.

In the first step, driver 23' of transceiver 70 sends a signal to transceiver 10. Driver 21 of repeater 40 is tristated (by inputting a logical "0" on enable line 52) and driver 3 of repeater 40 is activated by inputting logical "1" on enable line 52'. However, driver 23' of FIG. 8 is in an active state. Also in FIG. 8, driver 221 is either activated with a known input fed to node INB' or is tristated. If driver 221 is tristated, the input of devices 229 and 231 is connected to the output of driver 221, i.e. node 224. The result of this first step is that line 41 has a known state.

For the second step, driver 221 of transceiver 10 sends a data signal to transceiver 70. In this case driver 21 of the repeater 40 (FIG. 1) becomes activated by inputting a logical "1" through its enable control line 52. This allows driver 21 to transmit the signal from driver 221 (via transmission line 20 and receiver 11). This causes driver input line 42 to have a known state.

In this preferred embodiment, two separate control lines are needed and brought out to an external pin for each repeater circuit 40 in the data transmission path.

Subsequent to this initialization, the logical "1" and "0" signals will propagate throughout the repeater circuits, since all of the tristated drivers are enabled and the normal, bidirectional, data transmission can begin.

| Repeater Circuit | | | | | |
|---|---|---|---|---|---|
| 26 | 30/27/29 | 24/23 | 5/6 | 9/20/227 | 224 |
| 0 | 0 | 0 | 0 | 0 | 0 |
| 0 | 1.25 | 2.5 | 0 | 1.25 | 2.5 |
| 2.5 | 1.25 | 0 | 2.5 | 1.25 | 0 |
| 2.5 | 2.5 | 2.5 | 2.5 | 2.5 | 2.5 |

Referring to FIGS. 1 and 8, the operation of repeater circuit 40 of the present invention will now be described. The repeater circuit table correlates the various nodes in circuit 40 and transceivers 10, 70 with the voltages present at those nodes during output of digital signals on transmission lines 20 and 30, as well as receipt of signals therefrom.

In the driver/receiver circuit 1 of FIG. 1, node 6 will be described as the output node from driver 3 and node 9 as the input node from transmission line 20. Similarly, for circuit 2 the output node from driver 21 is node 24 and the input node is node 27. Those skilled in the art will understand that in the case of binary digital signals, there will be four cases to be considered at the interface of circuit 1 and transmission line 20, and the interface of circuit 2 and transmission line 30. Output node 6 (OUTA) in transmission line 20 may have any combination of 00, 01, 10 or 11. Similarly, transmission line 30 and output node 24 (OUTB) will also have a binary combination of 00, 01, 10 or 11. In this embodiment of the present invention, a zero is represented by 0 voltage while a logical 1 is 2.5 volts. The repeater circuit table shows various reference numerals relating to the nodes and components of FIG. 1 with associated columns including the various voltage levels at those points. Therefore, it can be seen that the combination of transmission line 30 (with a logic level output from driver 23') and node 24 include all four possibilities (00, 01, 10 and 11) where the repeater circuit table shows a logical 0 as 0 volts and a logical 1 as 2.5 volts. Similarly, node 6 and transmission line 20 (with a logic level output from driver 221) represent the four binary possibilities of 00, 01, 10 and 11 as shown. Node 27 of circuit 2 and node 9 of circuit 1 represent the input to differential receivers 33 and 11, respectively. Nodes 23 and 5 are the input to drivers 21 and 3, respectively. It can be seen that the output of differential receiver 11 is electrically the same as in the input to driver 21, and the output of receiver 33 is the input to driver 3.

Those skilled in the art will understand that for repeater circuit of FIG. 1 to operate simultaneously and bidirectionally, the input to driver 21 must follow the logic level input to receiver 11 from driver 221, via transmission line 20. Correspondingly, the input to driver 3 must follow the output of receiver 33 from transmission line 30. It can be seen from the repeater circuit table that the values at node 23, which is the input to driver 21, correspond to the logic levels from transmission line 20 and the input to driver 3 from node 5 correspond to the binary logic levels from transmission line 30.

The various modes possible for repeater circuit 40 will now be described with reference to circuit 1. In a first mode, driver 3 is outputting a logical 0 at node 6 and transmission line 20 is providing a logical 0 from node 227 of FIG. 8. Thus, node 9 presents a logical 0 to receiver 11 at IN+. The logical 0 at node 6 is input to the non-inverting buffer consisting of transistors 13 and 15 wherein P-type transistor 15 is turned on and a threshold voltage of 0.7 is provided to differential receiver 11 at IN–. In this case, the 0.7 volts compared to the 0 volts will cause an output of 0 volts (logical 0) to be present at node 23 and input to driver 21 for subsequent output on transmission line 30.

In a second mode, the logical 0 is still output from driver 3 but a binary logic level "1" is output from driver 221 and is present on transmission line 20. Zero volts at node 6 and 2.5 volts from driver 221 create a current flow that will cause a voltage drop across resistor 7 such that 1.25 volts is then present at node 9, transmission line 20 and node 227 of FIG. 8. This 1.25 volts is then input to receiver 11. Again, 0 volts at node 6 will cause 0.7 volts to be input to receiver 11 at IN–. In this case, a logical 1 is output from differential receiver 11 and input to driver 21 for transmission on line 30.

In a third mode, driver 3 is outputting a logical 1 (2.5 volts) at node 6 and driver 221 is at a logic level of "0" (0.0 volts). Transmission line 20 is then at 1.25 volts. In this case, node 9 is once again 1.25 volts while node 6 is at 2.5 volts which causes transistor 13 to be turned on and 1.8 volts to be present at differential receiver 11 on IN–. The 1.8 volts on IN– compared with the 1.25 volts on IN+ will cause receiver 11 to output a logical 0 to node 23. Driver 21 will then transmit this logical 0 onto transmission line 30.

In the fourth mode, driver 3 is outputting 2.5 volts (logical 1 ) and driver 221 is at a logic level "1" (2.5 volts) causing transmission line 20 to be at 2.5 volts, as well. In this case, there is no current flow and node 9 is at 2.5 volts. The 2.5 volts on node 6 will once again cause transistor 13 to conduct and input 1.8 volts to receiver 11 at IN–. In this case, 2.5 volts is present at IN+ thereby causing a logical 1 to be output from receiver 11 to node 23 and driver 21 for subsequent transmission onto transmission line 30 as logic level "1".

Circuit 2 operates in a manner identical to circuit 1 wherein a logical 0 output by driver 21 on node 24 and a logic level 0 from driver 23' (FIG. 8) present on transmission line 30 will cause 0.7 volts at IN– input to differential receiver 33, and 0 volts at IN+ input, thereby causing a logical 0 to be output from receiver 33 to node 5 and driver 3 for subsequent transmission on line 20. When driver 21 is outputting a logical 1 (2.5 volts) then a logical 0 output by driver 23' is present on transmission line 30. Therefore, transistor 29 of non-inverting buffer 35 is turned on and provides 1.8 volts to the IN– node of receiver 33. A voltage of 1.25 volts is still present at the IN+ input to receiver 33 causing logical 0 to be output to node 5 of circuit 1. Next, a logical 0 is output from driver 21 and a logical 1 is transmitted by driver 23' causing a voltage drop across resistor 25 and 1.25 volts to be present on transmission line 30. The 0.0 volts at node 24 causes transistor 31 of non-inverting buffer 35 to conduct and input 0.7 volts to receiver 33 at IN–. The 1.25 volts from node 27 will then be input to receiver 33 at IN+ and differential receiver 33 will output a logical 1 to node 5 and driver 3 for placement on transmission line 20. When a logical "1" (output by driver 23') is present on transmission line 30 (2.5 volts) and a logical "1" is output from driver 21 at node 24, then 2.5 volts is present at the IN+ input to receiver 33. Node 24 inputs 2.5 volts to non-inverting buffer 33 and causes transistor 29 to conduct and 1.8 volts to be present at the IN– node of receiver 33. In this case, a logical 1 is output from receiver 33 and input to driver 3 from node 5.

Therefore, it can be seen how repeater circuit 40 causes the output on transmission line 20 to follow the inputs received from transmission line 30. Similarly, the output on transmission line 30 will follow the inputs received from transmission line 20.

Figure 5:
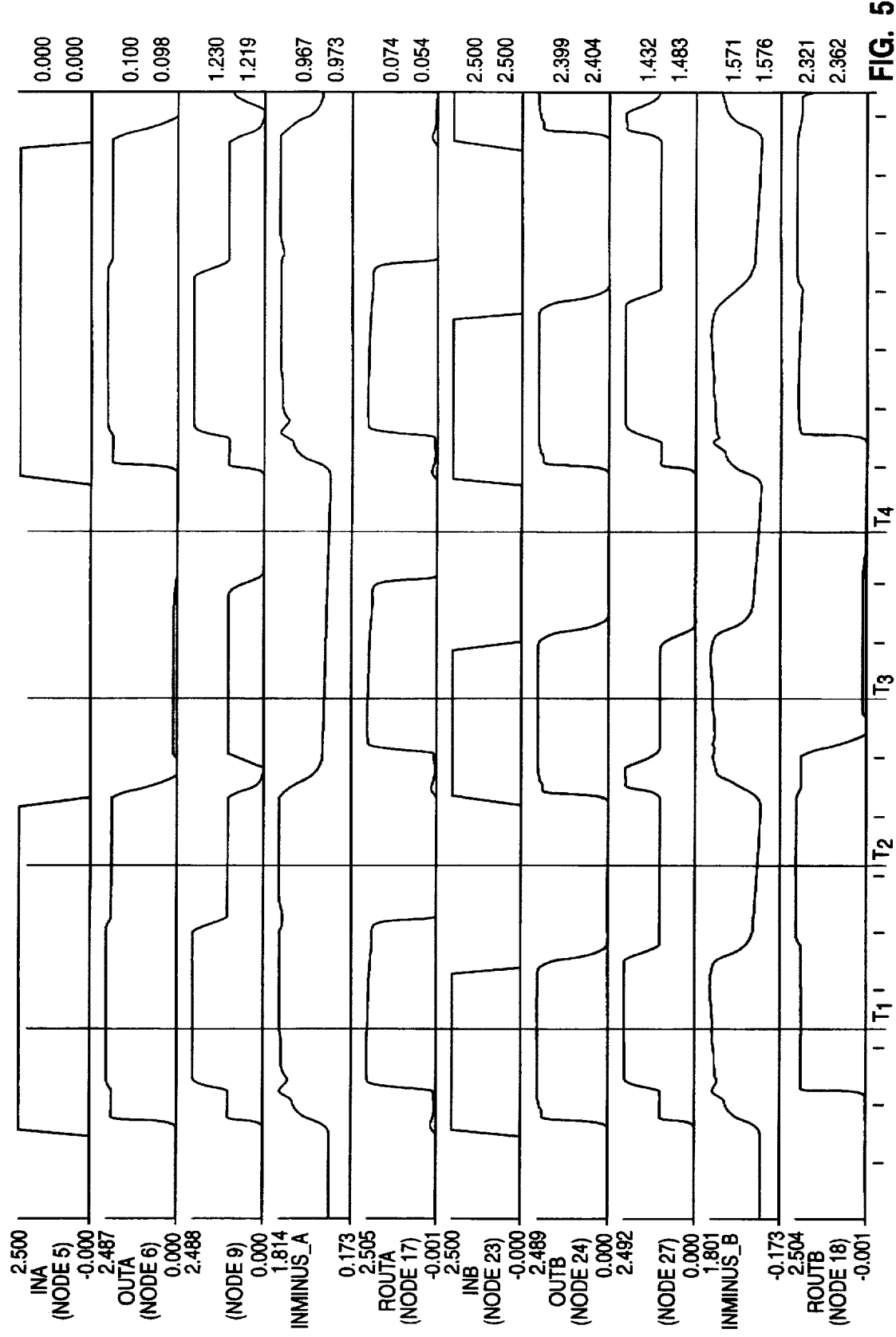
FIG. 5 is a graph showing the voltage waveforms at various points in circuit of FIG. 1 when operated as a simultaneous bidirectional driver/receiver circuit.
Figure 6:
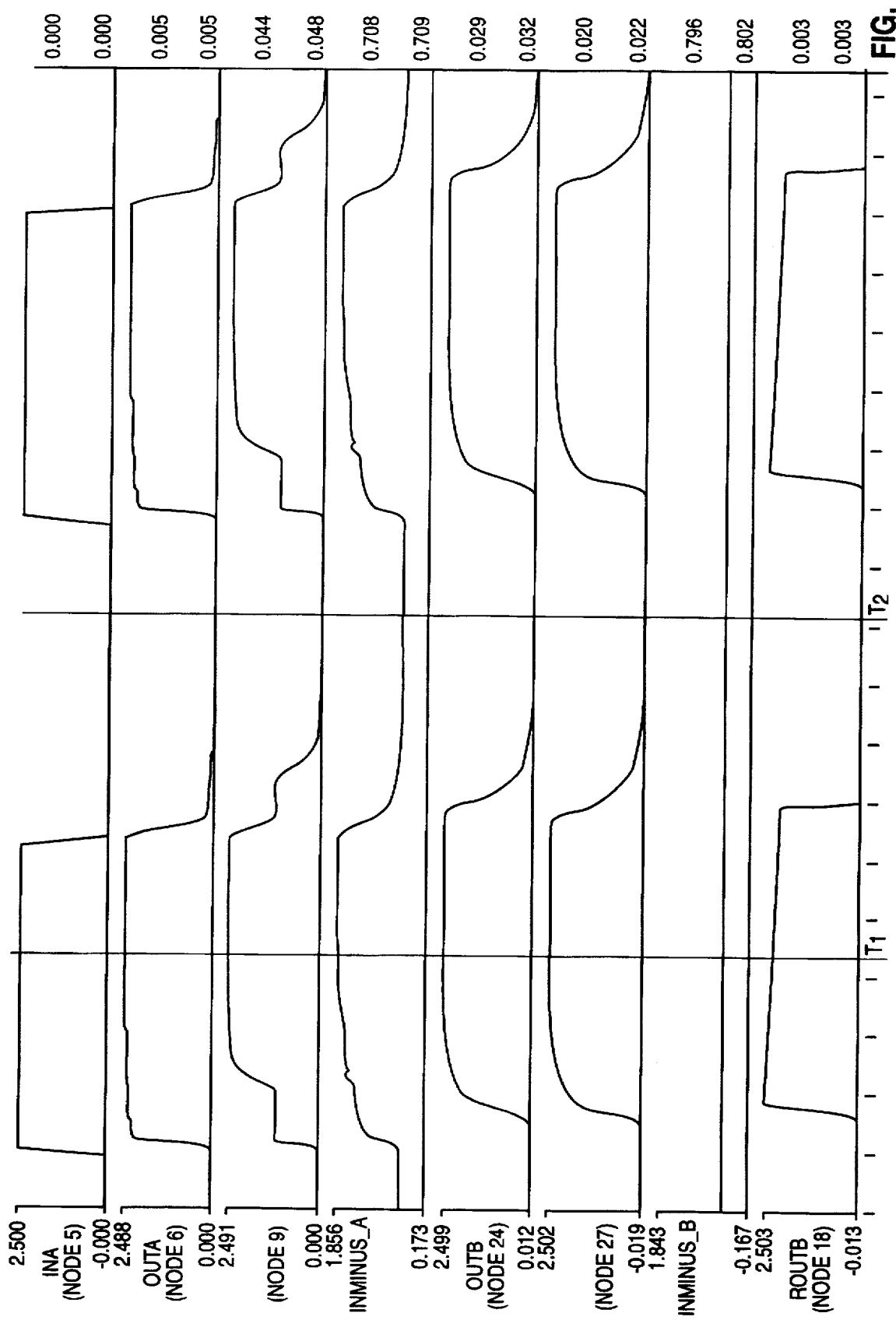
FIG. 6 is another voltage waveform graph of the voltage level over time for the circuit of FIG. 1 when operated as a unidirectional circuit.

FIGS. 5 and 6 are timing diagrams that will be used to further describe the present invention. These figures show voltage levels at the various nodes previously described with respect to FIG. 1, versus time. Referring to FIG. 5, it can be seen that at the first point in time (T1), the input to transceiver 1 at node 5 (INA) is a logical "1" and the input to transceiver 2 (INB) at node 23 is also a logical "1". This is the case where both driver/receiver pairs 1 and 2 are simultaneously transmitting a logical "1" to one another. The output of transceiver 2 is a logical "1" at node 18 (ROUTB), and the output of transceiver 1 is also a logical "1" at node 17 (ROUTA).

At time T2, the input to driver 3 at node 5 (and output at node 6) is a logical "1", while the input to driver 21 at node 23 (and output at node 24) is a logical "0". In this case the output of receiver 11 at node 17 will follow transmission line 20. And, the output of receiver 33 at node 18 will follow transmission line 30. Thus, it can be seen that transmission of logical signals along transmission lines 20 and 30 occurs at the same time through repeater 40.

At time T3, driver 3 is outputting a logical "0" at node 6 and driver 21 is outputting a logical "1" at node 24. Receiver 11 is outputting a logical "1" at node 17, while receiver 33 outputs a logical "0" at node 18. Again, receiver 11 and 33 output a signal which is identical to the signal received from transmission lines 20 and 30, respectively.

T4 shows the case where both driver 3 and 21 are outputting a logical "0" at nodes 6 and 24, respectively. Similarly, receivers 33 and 11 are both outputting a logical "0", such that simultaneous, bi-directional transmission of a logical "0" occurs between driver 3 and receiver 33, as well as driver 21 and receiver 11.

FIG. 6 illustrates the embodiment wherein transceiver circuit 1 of the repeater 40 of the present invention, operates in conjunction with another non-identical driver/receiver pair. At time T1, driver 3 outputs a logical "1", which is in turn output on transmission line 20. When the transceiver circuit 1 receives a logical "1", it is output by the receiver 33. Similarly, at time T2, when a logical "0" is output from driver 3, node 18 is at a logical "0". In this manner, it can be seen how the present invention can transmit digital signals (e.g. by driver 3) to non-identical circuit, and output digital signals (e.g. by receiver 33) received from other circuits using a unidirectional mode. It should be noted that the circuit 1 will operate in either the bi-directional, simultaneous, or uni-directional modes without any physical mode switching, or the like. The only requirement being that the impedance of the circuits must match, as previously described.

Figure 7A:
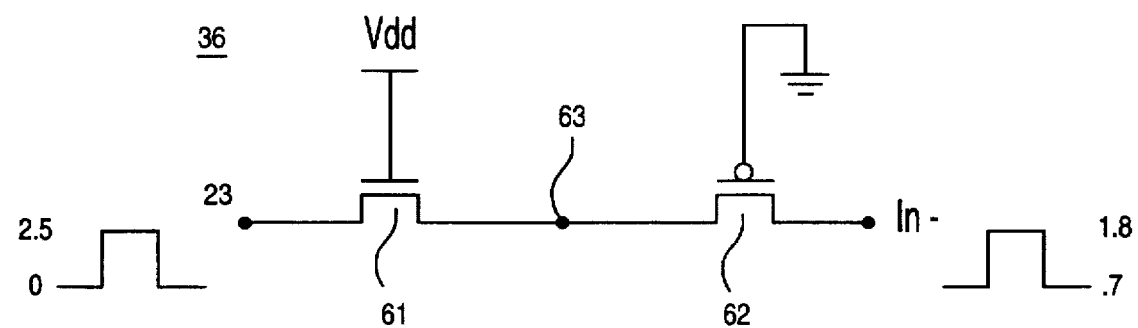
FIGS. 7A and 7B are circuit diagrams of another preferred embodiment of the present invention for providing non-negative voltages to a receiver circuit.
Figure 7B:
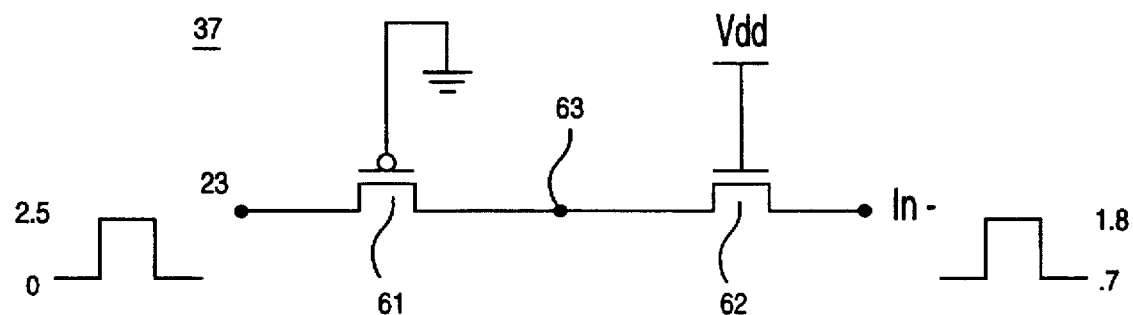

FIGS. 7A and 7B show another preferred embodiment of the present invention wherein circuits 36 and 37 can be substituted for the non-inverting buffer 35 of FIG. 1. Referring to circuit 36, an "N" type device 61 is connected to a "P" type device 62 through node 63. The input node 23 corresponds to input to driver 21, as illustrated in FIG. 1.

Transistor 61 is connected to Vdd (e.g. 2.5 volts) and transistor 62 is connected to ground (0.0 volts). Thus, devices 61 and 62 are both always "turned on". In a first case, when 2.5 volts is applied to the input node 23, 1.8 volts will be present at node 63 due to the threshold voltage drop of 0.7 volts across "N" device 61. However, the threshold of "P" type device 62 is below 1.8 volts such that 1.8 volts will be present at the output node IN–. In a second case, if 0.0 volts are applied to node 23, the threshold voltage level across transistor 61 is high enough with respect to ground, that 0.0 volts will also be present at node 63. The threshold voltage level of transistor 62, however, will cause 0.7 volts to be present at output node IN–. Thus, it can be seen that a voltage range of 0.0 to 2.5 volts applied at node 23 will cause a voltage range of from 0.7 to 1.8 volts to be output by node IN– (to differential receiver 33). A threshold voltage of 0.7 volts across transistors 61 and 62 has been used to provide consistency between the description of non-inverting buffer 35 and receiver 33, discussed above, and not as a limitation. Other voltage output ranges are possible by using differently sized transistors.

Circuit 37 is similar to circuit 36, except that the order of the "N" type device 61 and "P" type device 62 has been reversed. In this case, when 2.5 volts is applied to node 23, a threshold voltage drop is not present across "P" type device 62 causing 2.5 volts also to be present at node 63. However, a threshold voltage drop of 0.7 volts is present across transistor 61, causing 1.8 volts to be output on node IN–. When 0.0 volts are applied to node 23, a threshold voltage of 0.7 volts is present across transistor 62, causing 0.7 volts to be present at node 63. This voltage is beneath the threshold of "N" device 61 such that a threshold voltage drop is not present thereacross and 0.7 will be present at output node IN–.

Figure 9:
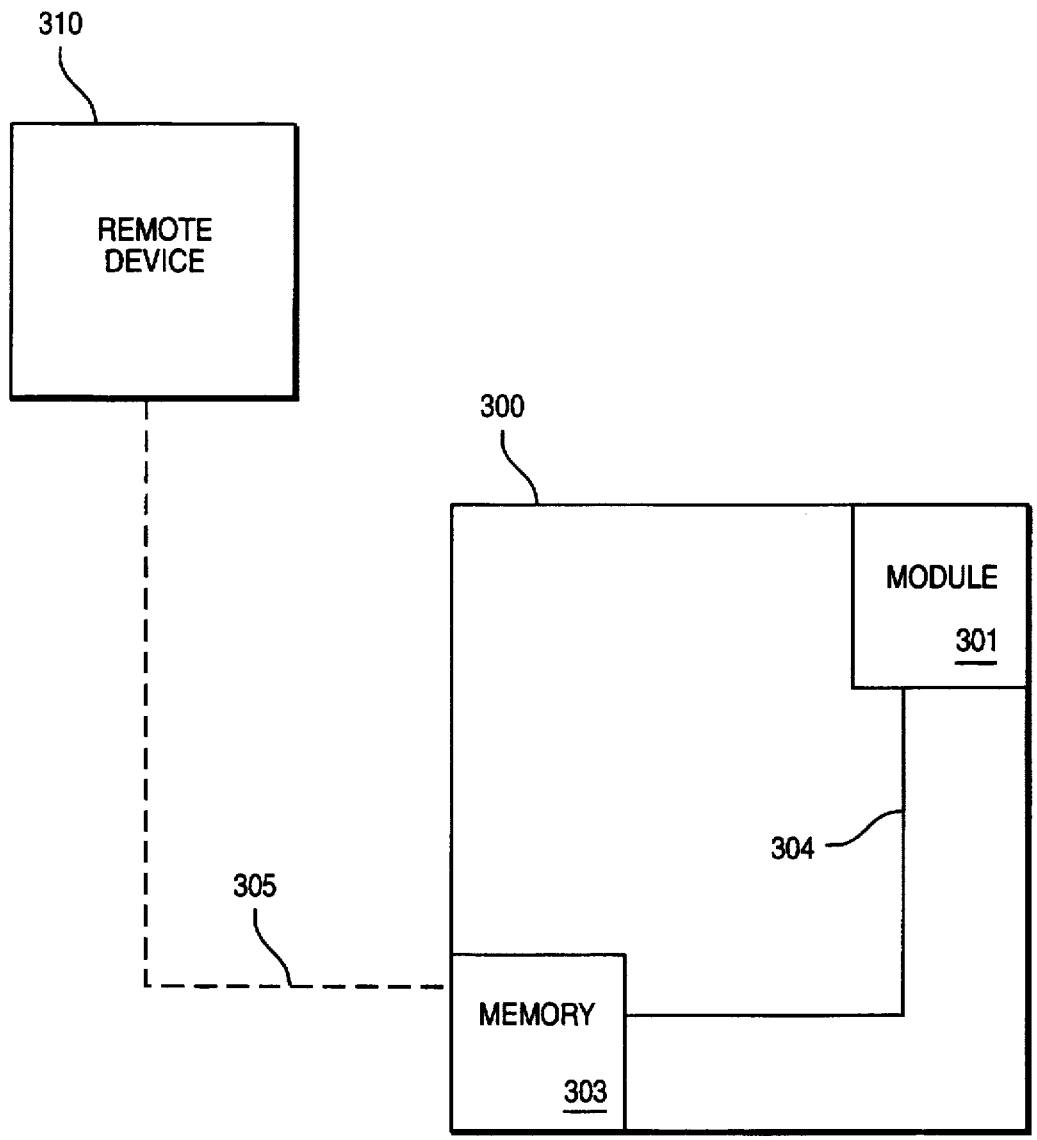
FIG. 9 is a block diagram illustrating some of the interconnections that can be made between components in a computer system that require long transmission lines.

Referring to FIG. 9, a system capable of using the repeater circuit of the present invention is shown. Reference numeral 300 represents a mainframe or enterprise-type computer. Computer 300 may be a traditional mainframe or one of the symmetric multi-processing units which have multiple nodes, or modules which communicate with one another and work together. In these large scale computer systems, it is often the case that a component such as module 301 needs to communicate with another component such as memory 303. A transmission line 304 is shown connecting module 301, such as a processing unit, with memory 303. In many cases, the length of transmission line 304 may cause a limitation on the processing speed of module 301. That is, the higher the clock frequency the more susceptible a system may be to noise and other external factors. Therefore, it can be seen that the repeater circuit 40 of FIG. 1, inserted intermediate between module 301 and memory 303, will allow higher processing speeds without the need to re-engineer or develop new transmission line technology. Additionally, enterprise server type machines are often connected with remote devices, such as device 310 which may be another external memory or peripheral component. As shown in FIG. 9, another transmission line 305 connects memory 303 with device 310. While the length of transmission line 304 may be on the order of one meter, or approximately 3 feet, transmission line 305 may be several hundred feet or longer. Therefore, a plurality of the repeater circuits of the present invention could be inserted at various intervals on intermediate device 310 and memory 303 in order to provide secure and efficient communication therebetween.

Additionally, many existing transmission lines include a single pair of conductors, one for a voltage and one for a reference potential, or ground. It can be seen that the repeater circuit 40 of FIG. 1 anticipates using only two conductors wherein one wire is connected, for example to node 9 for receiving a signal and the other connected to ground potential, e.g. the base of transistor 15. Thus, the present invention has utility in maintaining signal strength over long distances, but also allows existing transmission line technology to be used for signal communication.

Although certain preferred embodiments have been shown and described it should be understood that many changes and modifications may be made therein without departing from the scope of the appended claims.

We claim:

1. A repeater system for simultaneously and bidirectionally transmitting logic signals between a first and a second transmission line, comprising:

a first transceiver, including a first driver and a first differential receiver which is connected to said first transmission line;

a second transceiver, including a second driver and a second differential receiver which is connected to said second transmission line;

first means, coupled to an output of said first driver and said first transmission line, for generating a first non-zero reference voltage to be input to said first differential receiver;

second means, coupled to an output of said second driver and said second transmission line, for generating a second nonzero reference voltage to be input to said second differential receiver; and means for providing an output from said first differential receiver as an input to said second driver, and for providing an output from said second differential receiver as an input to said first driver.

2. A system according to claim 1 further comprising means for initializing said repeater system prior to commencement of simultaneous bidirectional transmission of logic signals by causing a known logic state to be input to said first and second drivers.

3. A system according to claim 2 wherein said means for initializing comprises:

a first latch, connected to the input of said first driver, for storing a first known logic value;

a second latch, connected to the input of said second driver, for storing a second known logic value;

first connection means for selectively connecting said first latch to the input of said first driver; and second connection means for selectively connecting said second latch to the input of said second driver;

wherein said first and second latches provide said first and second known logic values to said first and second drivers, respectively.

4. A system according to claim 3 wherein said first means comprises a first non-inverting buffer including a first N transistor connected to a voltage source and a first P transistor connected to ground.

5. A system according to claim 4 wherein said second means comprises a second non-inverting buffer including a second N transistor connected to a voltage source and a second P transistor connected to ground.

6. A system according to claim 5 wherein said first non-inverting buffer is connected to the output of the first driver and the first transmission line such that a voltage level, which is a composite of the output of the first driver and the first transmission line, is input to the gate of said first N transistor and said first P transistor.

7. A system according to claim 6 wherein said second non-inverting buffer is connected to the output of the second driver and the second transmission line such that a voltage level, which is a composite of the output of the second driver and the second transmission line, is input to the gate of said second N transistor and said second P transistor.

8. A system according to claim 2 wherein said means for initializing comprises:

a first N transistor connected to an input of said first driver; and a second N transistor connected to an input of said second driver;

wherein said first and second N transistors have an impedance relatively higher than an impedance of said first and second drivers, respectively.

9. A system according to claim 8 wherein said first and second N transistors are always in a turned on state.

10. A system according to claim 8 wherein said means for initializing further comprises means for selectively connecting said first and second N transistors to ground.

11. A system according to claim 2 wherein said means for initializing comprises means for selectively tristating said first and second drivers to cause said known logic state to be present at the input to said first and second drivers.

12. A repeater system, comprising:

a first transceiver, including a first driver and a first differential receiver which is connected to a first transmission line;

a second transceiver, including a second driver and a second differential receiver which is connected to a second transmission line;

first means, coupled to an output of said first driver and said first transmission line for generating a first nonzero reference voltage to be input to said first differential receiver, including a first non-inverting buffer including a first N transistor connected to a voltage source and a first P transistor connected to ground;

second means, coupled to an output of said second driver and said second transmission line for generating a second nonzero reference voltage to be input to said second differential receiver, including a second non-inverting buffer including a second N transistor connected to a voltage source and a second P transistor connected to ground;

means for providing an output from said first differential receiver as an input to said second driver;

means for providing an output from said second differential receiver as an input to said first driver; and means for initializing said repeater system prior to commencement of simultaneous bidirectional transmission of logic signals by causing a known logic state to be input to said first and second drivers;

wherein said first differential receiver provides an input to said second driver that causes a logic signal to be driven onto said second transmission line that is identical to a logic signal currently present on said first transmission line; and wherein said second differential receiver provides an input to said first driver that causes a logic signal to be driven onto said first transmission line that is identical to a logic signal currently present on said second transmission line.

13. A method for simultaneously and bidirectionally transmitting logic signals between a first and a second transmission line, comprising the steps of:

connecting a first transceiver, including a first driver and a first differential receiver to said first transmission line;

connecting a second transceiver, including a second driver and a second differential receiver to said second transmission line;

generating by a first means, coupled to an output of said first driver and said first transmission line, a first nonzero reference voltage to be input to said first differential receiver;

generating by a second means, coupled to an output of said second driver and said second transmission line, a second nonzero reference voltage to be input to said second differential receiver; and providing an output from said first differential receiver as an input to said second driver and providing an output from said second differential receiver as an input to said first driver.

14. A method according to claim 13 further comprising the step of initializing said repeater system prior to commencement of simultaneous bidirectional transmission of logic signals by causing a known logic state to be input to said first and second drivers.

15. A method according to claim 14 wherein said step of initializing comprises the steps of:

connecting a first latch to the input of said first driver, and storing a first known logic value therein;

connecting a second latch to the input of said second driver, and storing a second known logic value;

selectively connecting, by first connection means, said first latch to the input of said first driver; and selectively connecting, by second connection means, said second latch to the input of said second driver;

wherein said first and second latches provide said first and second known logic values to said first and second drivers, respectively.

16. A method according to claim 14 wherein said step of initializing comprises:

connecting a first N transistor to an input of said first driver; and connecting a second N transistor to an input of said second driver;

wherein said first and second N transistors have an impedance relatively higher than an impedance of said first and second drivers, respectively.

17. A method according to claim 16 wherein said step of initializing further comprises the step of maintaining said first and second N transistors in a turned on state.

18. A method according to claim 16 wherein said step of initializing further comprises the step of selectively connecting said first and second N transistors to ground.

19. A method according to claim 14 wherein said step of initializing comprises the step of selectively tristating said first and second drivers to cause said known logic state to be present at the input to said first and second drivers.

* * * * *